(12) United States Patent
Jean et al.

(10) Patent No.: US 7,308,094 B1
(45) Date of Patent: Dec. 11, 2007

(54) PROCESSES AND SYSTEMS FOR SCREENING WORK ORDERS

(75) Inventors: David R. Jean, Palo Alto, CA (US); Judy M. Marcopulos, Duluth, GA (US); Rita H. Scherer, Birmingham, AL (US)

(73) Assignee: AT&t Intellectual Property, Inc., Wilmington, DE (US)

( * ) Notice: Subject to any disclaimer, the term of this patent is extended or adjusted under 35 U.S.C. 154(b) by 837 days.

(21) Appl. No.: 09/946,269

(22) Filed: Sep. 4, 2001
(Under 37 CFR 1.47)

(51) Int. Cl.
H04M 1/24 (2006.01)
H04M 3/08 (2006.01)
H04M 3/22 (2006.01)

(52) U.S. Cl. .......... 379/379; 379/9.02; 379/9; 379/9.03; 379/9.04; 379/29.01

(58) Field of Classification Search ........... 379/9.02, 379/9.03, 9.04, 9, 15.01, 27.01, 29.01, 1.01
See application file for complete search history.

(56) References Cited

U.S. PATENT DOCUMENTS

| | | |
|---|---|---|
| 4,464,543 A | 8/1984 | Kline et al. |
| 5,155,761 A | 10/1992 | Hammond ............... 379/67 |
| 5,285,494 A | 2/1994 | Sprecher et al. |
| 5,406,616 A | 4/1995 | Bjorndahl ............... 379/59 |
| 5,689,550 A | 11/1997 | Garson et al. |
| 5,784,438 A | 7/1998 | Martinez ............... 379/89 |
| 5,790,633 A * | 8/1998 | Kinser et al. ........... 379/9.02 |
| 5,793,771 A | 8/1998 | Darland et al. .......... 370/467 |
| 5,893,906 A | 4/1999 | Daffin et al. |
| 5,920,846 A | 7/1999 | Storch et al. |
| 5,937,048 A | 8/1999 | Pelle |
| 5,946,372 A | 8/1999 | Jones et al. |
| 5,946,373 A | 8/1999 | Harris |
| 5,956,024 A | 9/1999 | Strickland et al. |
| 6,006,171 A | 12/1999 | Vines et al. |
| 6,018,567 A | 1/2000 | Dulman |

(Continued)

FOREIGN PATENT DOCUMENTS

WO    WO 02/45393 A2    6/2002

(Continued)

OTHER PUBLICATIONS

IP Infrastructure: The Fastest Track for Tomorrow's Unified Communications, Arthur Rosenberg and David Zimmer, The Unified View, Oct., 2000.

(Continued)

*Primary Examiner*—Quoc Tran
(74) *Attorney, Agent, or Firm*—Cantor Colburn LLP

(57) ABSTRACT

Processes and systems are disclosed for screening a work order to diagnose and to isolate trouble in a telephone system. One embodiment includes communicating with a communications network and acquiring work order information, the work order information representing the work order. The work order information may be annotated with at least one of a date, a time, and an origin of the work order. The work order information is filtered for a screening criteria, with the screening criteria having a corresponding action. The work order information is updated according to the corresponding action, with the corresponding action updating at least one of a telephone system status code, a telephone system route code, and a narrative portion describing the telephone system. The process screens the work order for known indications of trouble in the telephone system.

69 Claims, 7 Drawing Sheets

U.S. PATENT DOCUMENTS

| | | | |
|---|---|---|---|
| 6,032,039 A | 2/2000 | Kaplan | 455/413 |
| 6,173,047 B1 | 1/2001 | Malik | 379/207 |
| 6,175,859 B1 | 1/2001 | Mohler | 709/206 |
| 6,263,322 B1 | 7/2001 | Kirkevold et al. | |
| 6,289,382 B1 | 9/2001 | Bowman-Amuah | |
| 6,295,540 B1 | 9/2001 | Sanschagrin et al. | |
| 6,353,902 B1 * | 3/2002 | Kulatunge et al. | 714/712 |
| 6,356,928 B1 | 3/2002 | Rochkind | |
| 6,401,090 B1 | 6/2002 | Bailis et al. | |
| 6,445,774 B1 | 9/2002 | Kidder et al. | 379/9.03 |
| 6,446,123 B1 | 9/2002 | Ballantine et al. | |
| 6,493,694 B1 | 12/2002 | Xu et al. | |
| 6,614,882 B1 | 9/2003 | Beamon et al. | |
| 6,633,782 B1 * | 10/2003 | Schleiss et al. | 700/26 |
| 6,636,486 B1 | 10/2003 | Magloughlin | |
| 6,678,370 B1 | 1/2004 | Freebersyser et al. | |
| 6,788,765 B1 | 9/2004 | Beamon | |
| 6,845,148 B1 * | 1/2005 | Beamon | 379/9.02 |
| 6,870,900 B1 * | 3/2005 | Beamon | 379/9.03 |
| 6,937,993 B1 * | 8/2005 | Gabbita et al. | 705/8 |
| 6,961,415 B2 | 11/2005 | Doherty et al. | |
| 2001/0029504 A1 | 10/2001 | O'Kane, Jr. et al. | |
| 2002/0111842 A1 * | 8/2002 | Miles | 705/8 |
| 2002/0161731 A1 | 10/2002 | Tayebnejad et al. | |
| 2002/0168054 A1 | 11/2002 | Klos et al. | |
| 2003/0069797 A1 | 4/2003 | Harrison | |
| 2003/0078798 A1 * | 4/2003 | Zaks et al. | 705/1 |
| 2003/0187752 A1 | 10/2003 | Kapianen et al. | |
| 2004/0022379 A1 | 2/2004 | Klos et al. | |
| 2004/0052343 A1 * | 3/2004 | Glaser et al. | 379/88.22 |
| 2004/0260668 A1 | 12/2004 | Bradford | |
| 2006/0050862 A1 | 3/2006 | Shen et al. | |

OTHER PUBLICATIONS

TDB: Computerized Call Return Feature, IBM Technical Disclosure Bulletin, Apr., 1986.

BellSouth Memory Call VoiceMail Services, 1999.

Voice Profile for Internet Mail—Version 2, G. Vaudreuil—Lucent Technologies and G. Parsons—Northern Telecom, Sep., 1998.

An Extensible Message Fomat for Message Disposition Notifications, R. Fajman, National Institutes of Health, Mar. 1998.

Impact Voice Mail Server Deluxe, Black Ice Software Inc., CTI Expo, Spring 1999.

An Extensible Message Format for Message Disposition Notifications, R. Fajman, National Institutes of Health, Mar. 1998.

Voice Profile for Internet Mall - Version 2, G. Vaudreuil - Lucent Technologies and G. Parsons - Northern Telecom, Sep. 1998.

US 6,826,262, 11/2004, Jean et al. (withdrawn)

* cited by examiner

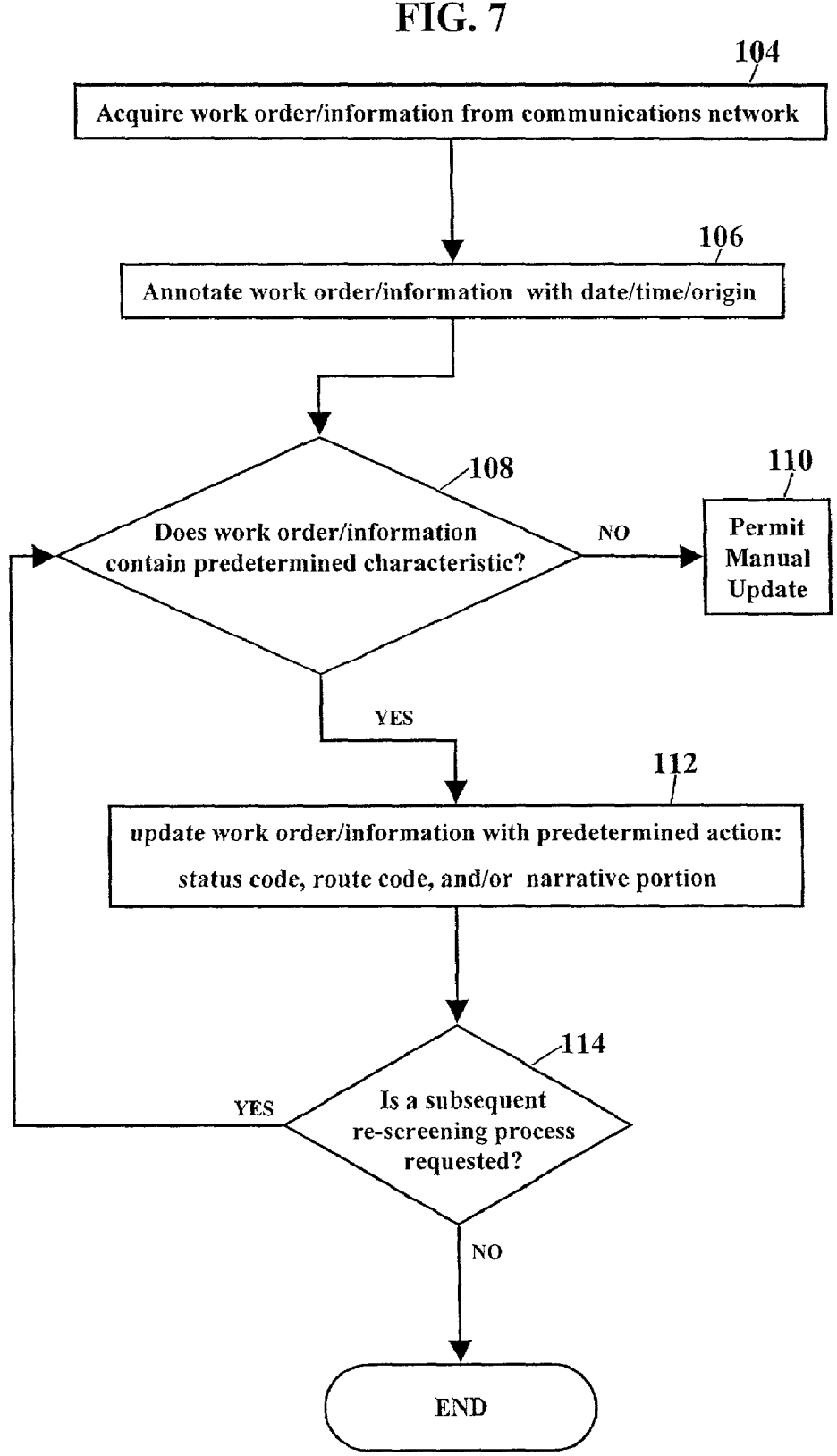

PROCESSES AND SYSTEMS FOR SCREENING WORK ORDERS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to work order management systems and, more particularly, to processes and systems for screening work orders to more quickly diagnose and resolve customer complaints.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of billions of copper cables and wires. Each of these copper cables must be maintained to provide superior telephone service to the customer.

Yet maintaining these copper cables and wires is an extraordinary task. The Public Switched Telephone Network, with its millions of copper cables and wires, may receive hundreds of maintenance calls per day. These maintenance calls, in turn, may result in hundreds of maintenance work orders. A single cable fault, for example, may sever telephone service to hundreds of customers. Construction crews can inadvertently severe telephone service to hundreds of customers. Storms, floods, and other natural disasters can interrupt telephone service and require thousands of man-hours of restoration. Even common, everyday exposure to ozone, summer heat, winter cold, and water can deteriorate and degrade copper cables and wires. These hundreds of daily maintenance calls, and the resultant work orders, must be efficiently managed to prevent maintenance costs from eroding profits.

Although hundreds of work orders are generated each day, quickly filtering these work orders has remained an illusive goal. Managers have no methods of automatically screening work orders to quickly diagnose and to quickly resolve problems. Once an available technician, for example, receives a week-old work order, the available technician may discover he or she was just in the vicinity of the repair yesterday or even a few days before. Screening work orders for common geographic characteristics, however, could have prevented inefficiently rolling another repair truck to the same vicinity. If, as another example, the work order describes a problem with a customer's digital subscriber line, a technician with inadequate training or inadequate equipment could initially be assigned the repair. Screening work orders, again, could identify complex problems and help assign technicians with proper training. The inability to screen work orders, however, habitually fosters inefficiencies and needlessly increases costs.

There is, accordingly, a need in the art for work order management systems that screen work orders, that efficiently utilize technician capabilities and equipment, that provide faster repair service to customers, and that reduce the costs of maintaining operations.

BRIEF SUMMARY OF THE INVENTION

The aforementioned problems are reduced by a Screening Manager module. The Screening Manager module comprises processes and systems that screen work orders for recognizable characteristics. Screening work orders for recognizable characteristics allows managers to quickly identify the root cause of problems. Screening work orders for recognizable characteristics also promotes a faster resolution of the problem once the root cause is known. These recognizable characteristics could include the same or similar trouble description, the same or similar maintenance location, the same or similar equipment, the same technician or manager or group, or any other characteristic the user desires.

The Screening Manager module improves the efficiency of work order management. The Screening Manager module filters work orders for any characteristic a manager desires. If the characteristic is found, the manager may then specify what action should be taken to update the work order and help resolve the problem. If, for example, the work order includes a trouble code indicating a problem with complex equipment, the manager could specify that a certain knowledgeable, properly-trained technician receive the work order. If the work order describes a repair requiring heavy equipment, the Screening Manager module could automatically specify that a certain repair crew, with the heavy equipment, receive the work order. If the work order describes a repair on the north edge of town, the Screening Manager module could assign a technician living on that north edge of town. In this way the technician may drive a repair truck home at night and, the next morning, immediately drive to the repair site. If a work order is aged, indicating a customer's trouble has been outstanding for several days, a manager could specify that aged work orders receive highest priority to speed resolution and improve customer service. The Screening Manager module thus provides a fast and automatic method of screening work orders for characteristics that help diagnose and resolve customer problems. The Screening Manager module allows users, technicians, and managers to quickly spot the root cause of problems and to quickly and efficiently resolve customer complaints.

The present invention also reduces maintenance costs. Because the Screening Manager module screens work orders and quickly diagnoses problems, managers and technicians spend less time analyzing work orders. Once the Screening Manager module screens the work order and quickly diagnoses the problem, the Screening Manager module then automatically implements an action to speed resolution of the problem. Managers and technicians also spend less time deciding how to resolve the customer's complaint. The Screening Manager module reduces labor costs—often the most expensive fixed cost in most operations. Maintenance forces may now complete and close more work orders without rolling more trucks and technicians. The present invention is thus a tool to achieve significant cost reductions and, yet, improvements in service and in quality.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein:

FIG. 7 is a flowchart describing a process of screening a work order to diagnose trouble in a telephone system.

DETAILED DESCRIPTION OF THE INVENTION

Figure 1:
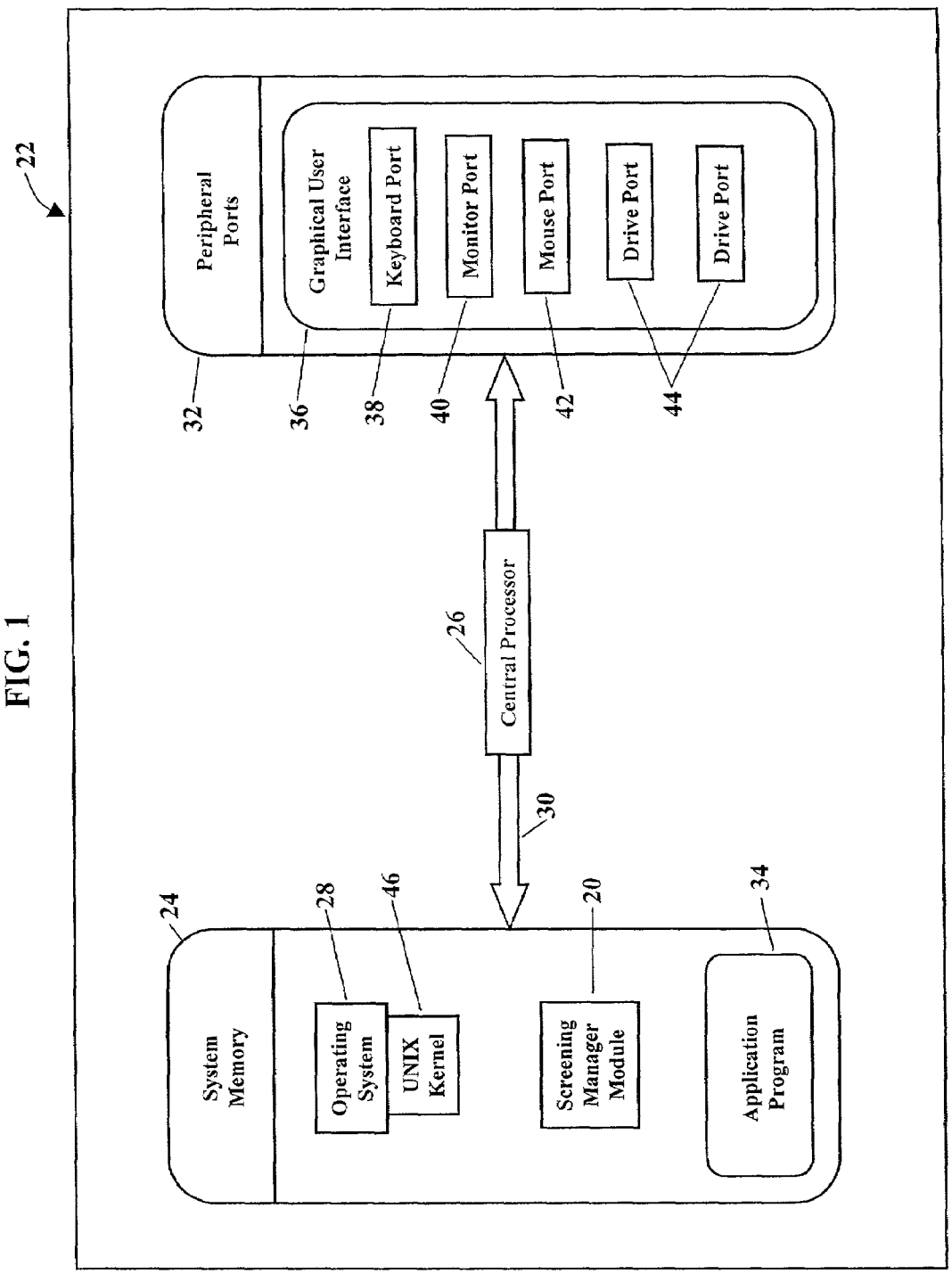
FIG. 1 is a block diagram showing a Screening Manager module residing in a computer system.

The present invention particularly relates to processes and systems for screening a work order to diagnose and to isolate trouble in a telephone system. A "work order," as used herein, is information describing a maintenance task to be performed. One embodiment includes communicating with a communications network and acquiring work order information, the work order information representing the work order. The work order information may be annotated with at least one of a date, a time, and an origin of the work order. The work order information is filtered for a screening criteria, with the screening criteria having a corresponding action. The work order information is updated according to the corresponding action, with the corresponding action updating at least one of a telephone system status code, a telephone system route code, and a narrative portion describing the telephone system. The process, therefore, screens the work order for known indications of trouble in the telephone system.

An alternative embodiment describes a process of screening a work order to diagnose and to isolate trouble in a telephone system. This alternative embodiment includes communicating with a communications network and requesting that the work order be annotated with at least one of a date, a time, and an origin of the work order. The process inquires if the new work order contains a screening criteria, with the screening criteria having a corresponding action. The alternative embodiment requests that the work order information be updated according to an action corresponding to the screening criteria, the corresponding action updating at least one of a telephone system status code, a telephone system route code, and a narrative portion describing the telephone system. The process screens the work order to diagnose and to isolate the trouble in the telephone system.

A further embodiment describes a process of screening a work order to diagnose trouble in a telephone system. This embodiment communicates with a communications network and acquires work order information. The work order information represents the work order. The work order information is searched for a predetermined characteristic of the telephone system. The work order information is updated with a predetermined action, with the predetermined action corresponding to the predetermined characteristic of the telephone system. The work order is thus screened for characteristics that help diagnose trouble in the telephone system.

Another aspect discloses a process of screening a work order to diagnose trouble in a telephone system. This aspect communicates with a communications network and acquires work order information, with the work order information representing the work order. The work order information is annotated with at least one of a date, a time, and an origin of the work order. The work order information is searched for a predetermined characteristic of the telephone system, and the work order information is updated with a predetermined action. The predetermined action corresponds to the predetermined characteristic of the telephone system. The predetermined action updates at least one of a telephone system status code, a telephone system route code, and a narrative portion describing the telephone system. The work order is screened for characteristics that help diagnose trouble in the telephone system.

Still a further embodiment describes a process of screening a work order to diagnose trouble in a telephone system. This embodiment communicates with a communications network and requests a search of work order information for a predetermined characteristic of the telephone system. The work order information represents the work order. The embodiment also communicates with the communications network and requests an update of the work order information according to a predetermined action. The predetermined action corresponds to the predetermined characteristic of the telephone system. The predetermined action updates at least one of a telephone system status code, a telephone system route code, and a narrative portion describing the telephone system. The work order is thus screened for characteristics that help diagnose trouble in the telephone system.

Another embodiment describes a process of screening a work order to diagnose trouble in a telephone system. Here again the embodiment communicates with a communications network and requests work order information be annotated with at least one of a date, a time, and an origin of the work order. The work order information represents the work order. The embodiment also requests a search of the work order information for a predetermined characteristic of the telephone system. If the predetermined characteristic is found, the embodiment requests an update of the work order information according to a predetermined action, with the predetermined action corresponding to the predetermined characteristic of the telephone system. The predetermined action updates at least one of a telephone system status code, a telephone system route code, and a narrative portion describing the telephone system. The work order is screened for characteristics that help diagnose trouble in the telephone system.

A system is also disclosed for screening a work order. The system has a Screening Manager module and a processor. The Screening Manager module searches work order information for a screening criteria, with the work order information representing the work order. The Screening Manager updates the work order according to an action corresponding to the search criteria, the action updating at least one of a telephone system status code, a telephone system route code, and a narrative portion describing the telephone system. The processor is capable of searching the work order information and is capable of updating the work order information.

A computer program product is also disclosed. The computer program product screens a work order to diagnose trouble in a telephone system. The computer program product has a Screening Manager module stored on a computer-readable medium. The Screening Manager module searches work order information for a screening criteria, with the work order information representing the work order. The Screening Manager updates the work order according to an action corresponding to the search criteria, the action updating at least one of a telephone system status code, a telephone system route code, and a narrative portion describing the telephone system.

Figure 2:
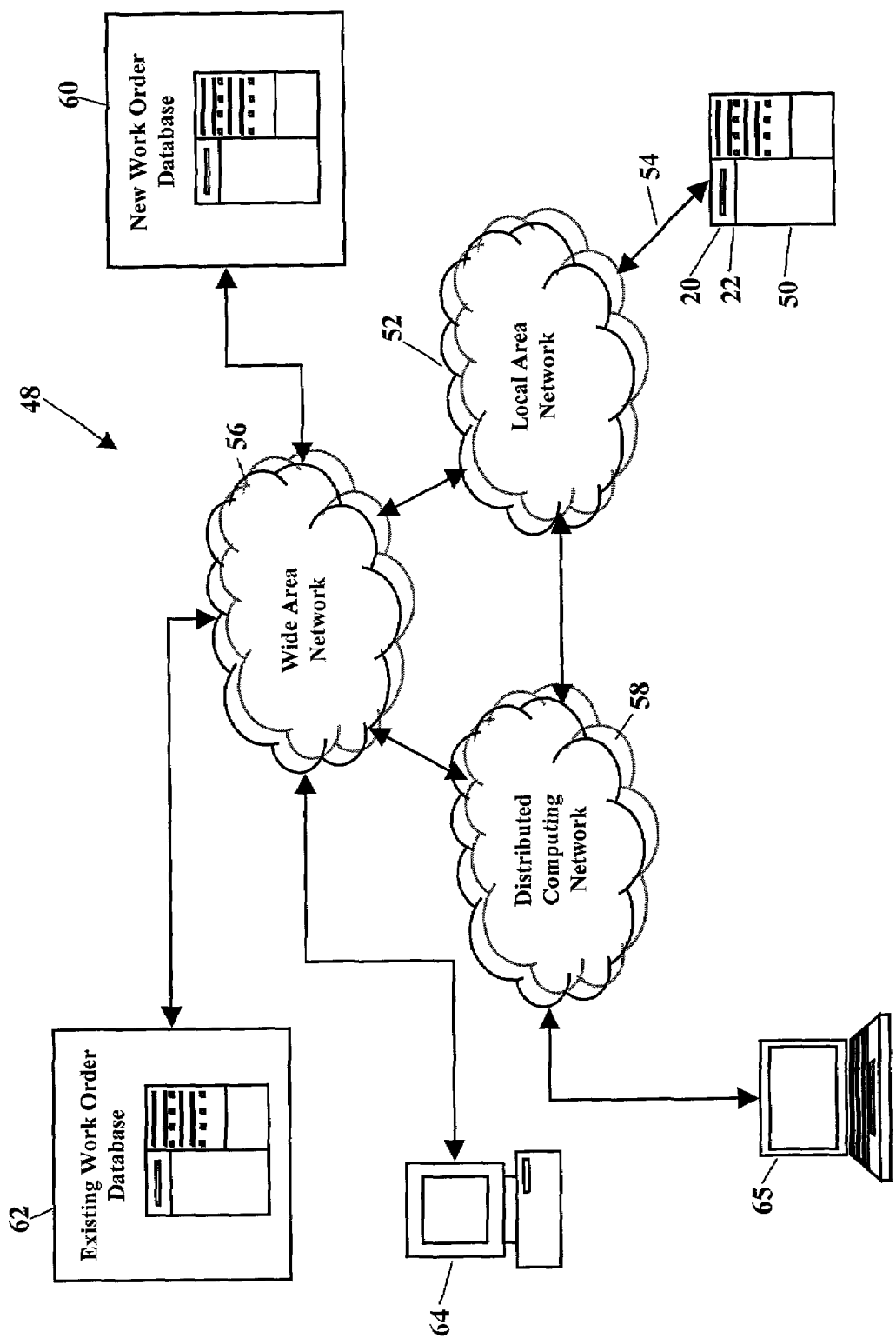
FIG. 2 is a block diagram of a communications network representing an operating environment for the Screening Manager module.

FIGS. 1 and 2 depict a possible operating environment for an embodiment of the present invention. This embodiment of a Screening Manager module 20 comprises a computer program that correlates and groups work order information. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Screening Manager module 20 residing in a computer system 22. The Screening Manager module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufactures also offer microprocessors. Such other manufactures include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacture's central processor.

The preferred operating system 28 is the UNIX® operating system (UNIX® is a registered trademark of the Open Source Group). Those skilled in the art also recognize many other operating systems are suitable. Other suitable operating systems include UNIX-based LINUX, WINDOWS NT® (WINDOWS NT® is a registered trademark of Microsoft Corporation, One Microsoft Way, Redmond Wash. 98052-6399, 425.882.8080), and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a block diagram of a communications network 48. This communications network 48 further represents an operating environment for the Screening Manager module 20. The Screening Manager module 20 resides within the memory storage device (shown as reference numeral 24 in FIG. 1) in the computer system 22. The computer system 22 is conveniently shown as a computer server 50, however, the Screening Manager module 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Screening Manager module 20 to request and acquire information from many computers connected to the Local Area Network 52, the Wide Area Network 56, and the globally-distributed computing network 58.

As FIG. 2 shows, the Screening Manager module 20 sends and receives information to/from many other computers connected to the communications network 48. The Screening Manager module 20, for example, may acquire new work order information from a server maintaining a new work order database 60. The Screening Manager module 20 may also acquire existing work order information from a server maintaining an existing work order database 62. The Screening Manager module 20 may communicate this acquired information over the communications network 48 to a user at a user computer 64. FIG. 2 even shows that remote users, such as programmers and engineers, may use a portable computer 65 to access the communications network 48 and remotely access the Screening Manager module 20. Because many computers may be connected to the communications network 48, computers and computer users may share and communicate a vast amount of information.

Figure 3:
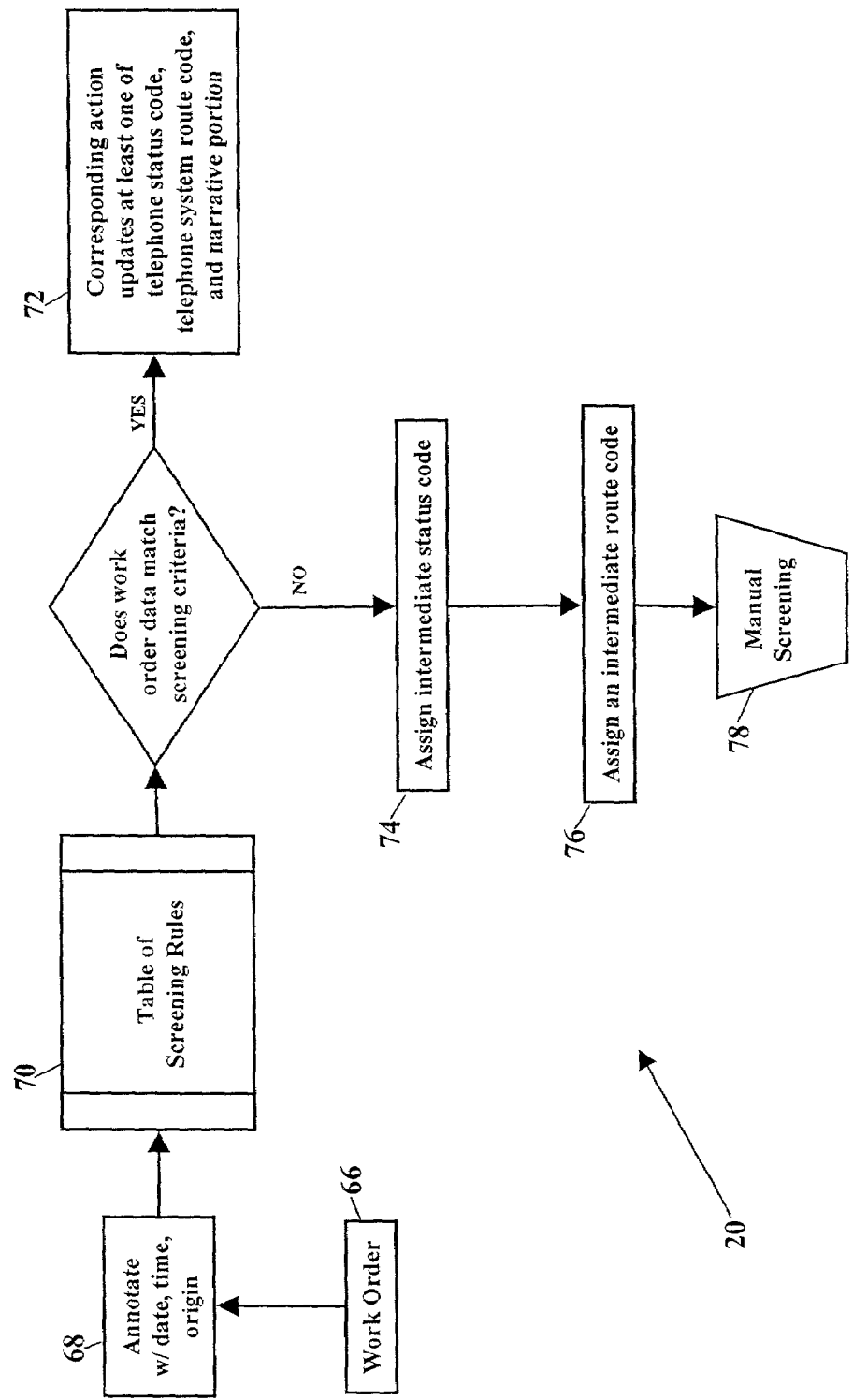
FIG. 3 is a block diagram showing one embodiment of the Screening Manager module.

FIG. 3 is a block diagram showing one embodiment of the Screening Manager module The Screening Manager module 20, in this embodiment, is a computer program that acquires a work order 66 from the communications network (shown as reference numeral 48 in FIG. 2) and screens the work order for known indications of trouble in the telephone system. As FIG. 3 illustrates, the work order 66 is annotated 68 with at least one of a date, a time, and an origin of the work order. The annotated work order 66 is then filtered using a table 70 of screening rules. The table 70 of screening rules contains at least one user-defined screening criteria and a corresponding action. If the work order 66 contains data that matches the screening criteria, then the Screening Manager module 20 updates 72 the work order according to the corresponding action. The corresponding action updates at least one of a telephone status code, a telephone system route code, and a narrative portion of the work order 66. The table 70 of screening rules may thus be used to filter the work order 66 for known trouble codes or for other definable criteria.

If the screening criteria is not found, then the work order 66 may require manual screening. If the work order 66 does not contain data that matches the screening criteria, then the Screening Manager module 20 may assign a specific status code 74 and may assign a specific route code 76. These exception cases, where no rules apply and, thus, no action is taken, could then be manually screened 78 using human analysis. Manual screening, however, would still update the telephone status code, the telephone system route code, and the narrative portion of the work order 66. Even a manually screened work order 66, therefore, would still be filtered for known indications of trouble.

The table 70 of screening rules are user-defined. The table 70 of screening rules may be defined for specific geographic regions, time zones, areas, and/or districts. The screening rules, for example, could be defined to simply screen for a nearest appointment date, for a nearest appointment time, or for an oldest aged date and time. The table 70 of screening rules could also contain more complex screening criteria stated in logical expressions. Below is an example of the table 70 of screening rules:

| Screening Criteria | Corresponding Action |
|---|---|
| 1) Handle Code = ADSL | Set status = PDZ |
| | Set route = 557 |
| | Set narrative to "Call 555-121-8846 when DPO" |
| 2) Status = AJR and # subs ≥ 2 and LCD ≤ 48 hrs | Set status = ACB |
| | Set route = 298 |
| | Set narrative = "AAJR VER 0 Clear/Close by AJR" |

The Screening Manager module 20 could also permit subsequent re-screening operations. If, for example, the work order 66 has already been filtered, the Screening Manager module 20 may subsequently re-screen the work order 66 after a timed interval. This re-screening operation would, again, filter the work order 66 with the user-defined screening criteria and the corresponding action. The subsequent corresponding action would again update the work order 66 with at least one of a subsequent or a second telephone status code, a subsequent or a second telephone system route code, and the narrative portion of the work order 66. A user could even request a screening activity log describing one or all screening operations performed on the work order 66.

Figure 4:
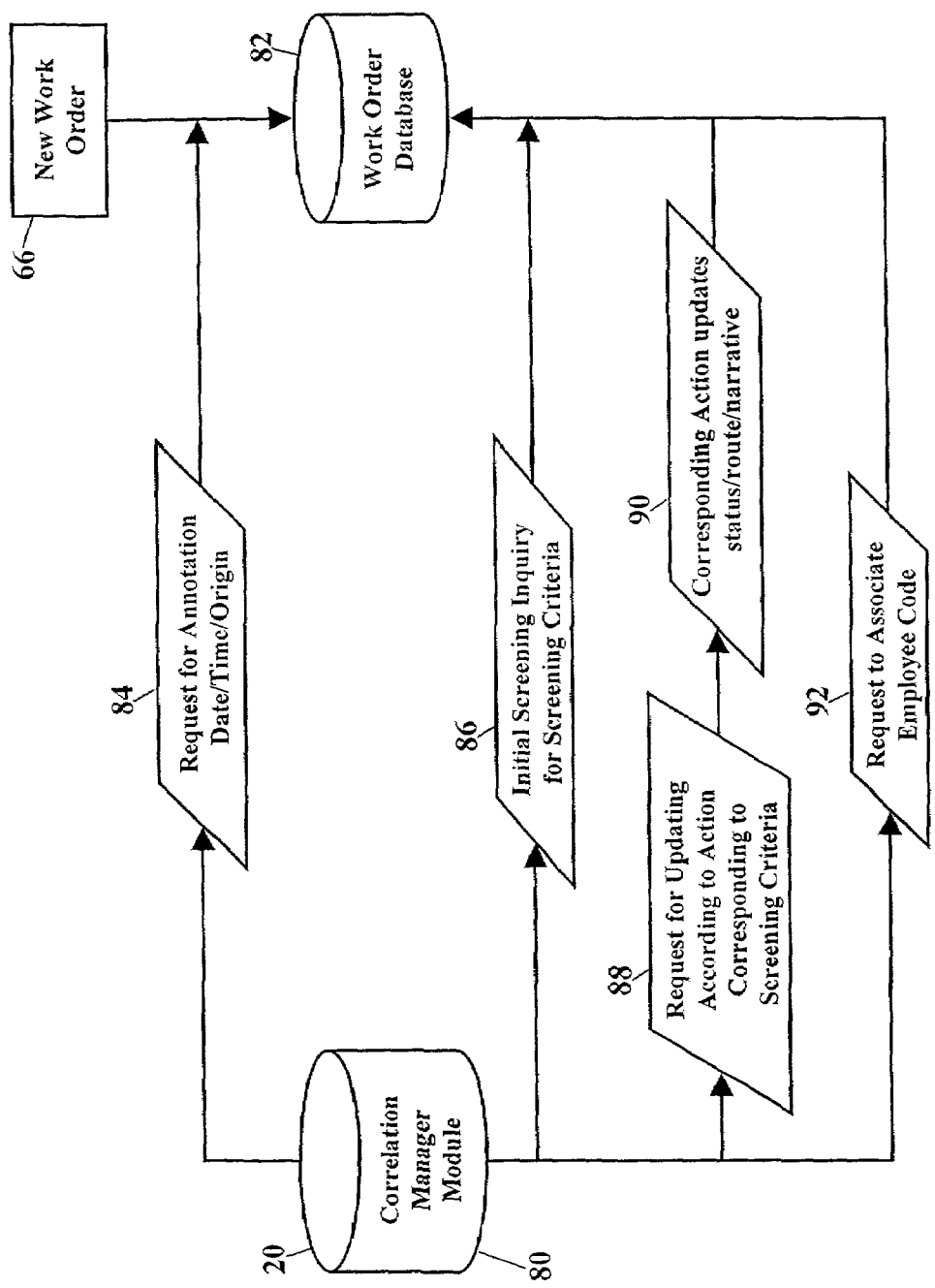
FIG. 4 is a schematic drawing showing another embodiment of the Screening Manager module.

FIG. 4 is a schematic drawing showing another embodiment of the Screening Manager module 20. The Screening Manager module 20 is a computer program running on a database server 80. The work order 66 is communicated over the communications network (shown as reference numeral 48 in FIG. 2) to a work order database 82. The work order database 82 stores the work order 66 with previously-created, existing work orders. The Screening Manager module 20 communicates with the communications network and sends a request 84 for annotation. The request 84 for annotation requests that the work order 66 be annotated with at least one of a date, a time, and an origin of the work order 66.

The Screening Manager module 20 then requests filtering of the work order 66. The Screening Manager module 20 requests that the work order 66 be filtered for one or more recognized screening criteria. If the work order contains the screening criteria, then the Screening Manager module 20 could diagnose and isolate trouble in a telephone system. The Screening Manager module 20 communicates with the communications network and sends an initial screening inquiry 86. The initial screening inquiry 86 inquires whether the work order 66 contains the screening criteria. If the work order 66 has data elements that match the screening criteria, the Screening Manager module 20 sends a request 88 for updating. The request 88 for updating initiates an update of the work order 66 according to an action corresponding to the screening criteria. The corresponding action 90 updates at least one of a telephone status code, a telephone system route code, and a narrative portion of the work order 66. The Screening Manager module 20 may even communicate a request 92 to associate an employee code to the work order 66.

Figure 5:
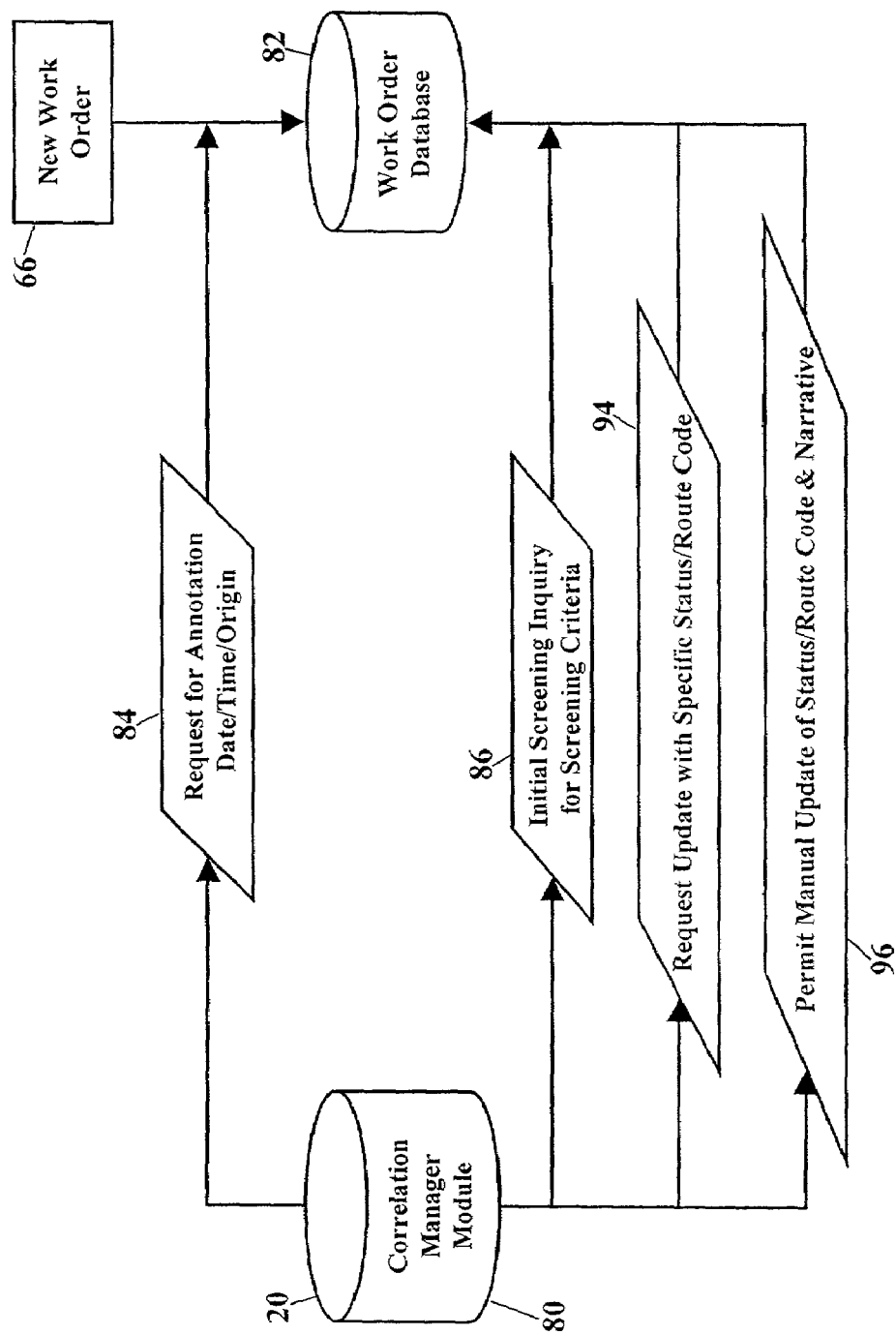
FIG. 5 is a schematic drawing showing still another embodiment of the Screening Manager module.

FIG. 5 is a schematic drawing showing still another embodiment of the Screening Manager module 20. This embodiment permits the work order 66 to be manually updated when the screening criteria fails. As FIG. 5 shows, the Screening Manager module 20 communicates with the communications network and sends the request 84 for annotation. The Screening Manager module 20 also sends the initial screening inquiry 86. The initial screening inquiry 86 inquires whether the work order 66 contains the screening criteria. If the initial screening inquiry 86 is unsuccessful, indicating the screening criteria is not found, then the work order 66 may require manual screening. The Screening Manager module 20 sends a request 94 to update the work order 66 with a specific telephone system status code and/or a specific telephone system route code. The specific telephone system status code and route code flags the work order 66 for a manual screening analysis. The Screening Manager module 20 thus sends a permit 96 to allow a user to manually update the telephone status code, the telephone system route code, and the narrative portion of the work order 66.

Figure 6:
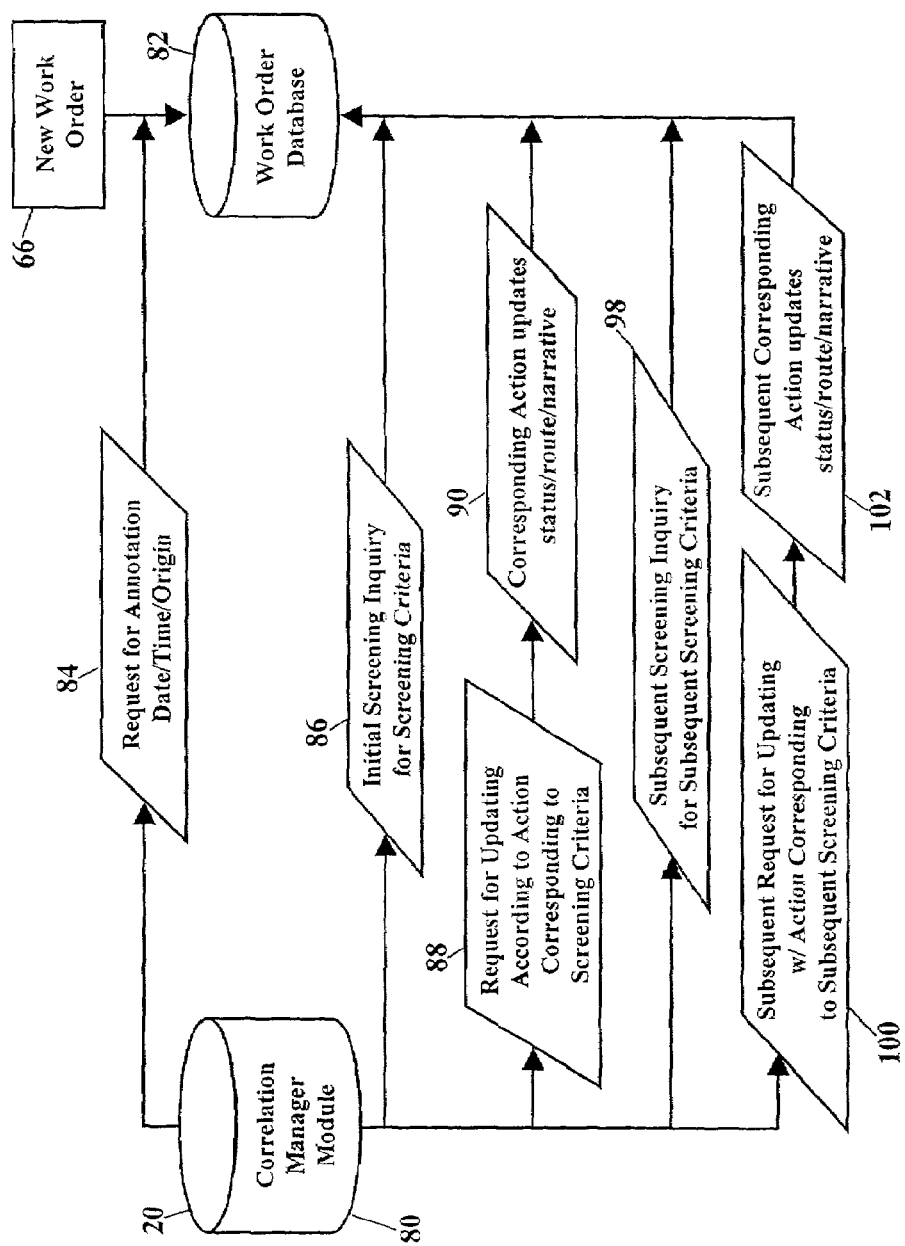
FIG. 6 is a schematic drawing showing a further embodiment of the Screening Manager module.

FIG. 6 is a schematic drawing showing a further embodiment of the Screening Manager module 20. Here the Screening Manager module 20 initiates a subsequent re-screening process. The Screening Manager module 20 communicates with the communications network and sends the request 84 for annotation. FIG. 6 shows, as before, the Screening Manager module 20 sends the initial screening inquiry 86 and inquires whether the work order 66 contains the screening criteria. If the screening criteria is found, the Screening Manager module 20 sends the request 88 for updating. The request 88 for updating initiates an update of the work order 66 according to an action corresponding to the screening criteria. The corresponding action 90 updates at least one of a telephone status code, a telephone system route code, and a narrative portion of the work order 66. The Screening Manager module 20 may subsequently re-screen the work order 66 after a timed interval or after a request. This re-screening operation would, again, filter the work order 66 with a user-defined subsequent screening criteria and a subsequent corresponding action. The Screening Manager module 20 sends a subsequent screening inquiry 98 and inquires whether the work order 66 contains the subsequent screening criteria. If the subsequent screening criteria is found, the Screening Manager module 20 sends a subsequent request 100 for updating. The subsequent request 100 for updating initiates an update of the work order 66 according to a subsequent action 102 corresponding to the subsequent screening criteria. The subsequent corresponding action 102 updates at least one of a telephone status code, a telephone system route code, and a narrative portion of the work order 66. The subsequent corresponding action would again update the work order 66 with at least one of a subsequent or a second telephone status code, a subsequent or a second telephone system route code, and the narrative portion of the work order 66.

FIG. 7 is a flowchart describing a process of screening a work order to diagnose trouble in a telephone system. Work order information is acquired from a communications network (Block 104). The work order information represents the work order. The work order information is annotated with at least one of a date, a time, and an origin of the work order (Block 106). The work order information is searched for a predetermined characteristic of the telephone system (Block 108). If the predetermined characteristic is not found, the process permits a manual update (Block 110) (the manual update is more fully described with reference to FIG. 5 and the accompanying text). If the predetermined characteristic is found, the work order information is updated with a predetermined action (Block 112). The predetermined action corresponds to the predetermined characteristic of the telephone system. The predetermined action updates at least one of a telephone system status code, a telephone system route code, and a narrative portion describing the telephone system. If a subsequent re-screening operation is desired (Block 114), whether requested by a user or required after a timed interval, the work order information is searched for a subsequent, predetermined characteristic of the telephone system (Block 108). The process thus screens the work order for characteristics that help diagnose trouble in the telephone system.

Work orders may be screened for many characteristics of the telephone system. The work order information, for example, may be searched for at least one of a telephone system trouble code, a telephone system central office failure, a telephone system cable failure, and a telephone system terminal equipment failure. The work order information could also be screened for at least one of a designation of a region, a designation of a time zone, a designation of an area, a designation of a district, a designation of a manager, a designation of a supervisor, and a designation of a technician. The work order information could also be searched for characteristics of a telephone system local loop, characteristics of a digital subscriber line system, characteristics of a fiber optic network system, characteristics of a digital loop carrier equipment system, and characteristics of a telephone system pair gain equipment system. The screening criteria may, in short, be any characteristic of the telephone system that helps filter work orders to identify known trouble and that helps speed closure of trouble reports.

Work orders may also be screened for geographic characteristics. The Screening Manager module 20 could establish "turfs" to help screen work orders. A turf would be a wire center, a collection of wire centers, a district, an area, a state, or other geographic characteristic. Whatever the designation of a turf, the turf would be a unique identifier or name. The concept of turfs could include various "levels," such region, state, area, district, general manager, manager, and wire center. The wire center could be a common component across all levels of turfs. Turfs could also overlap across wire centers. The concept of turfs could also provide relationships between wire center, class of service, and network management number.

The Screening Manager module (shown as reference numeral 20 in FIGS. 1–6) may be physically embodied on or in a computer-readable medium. The computer-readable medium includes CD-ROM, DVD, tape, cassette, floppy disk, memory card, and a large-capacity disk (such as IOMEGA®, ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer readable media, and other types not mentioned here but considered within the scope of the present invention, allow the Screening Manager module to be easily disseminated. A computer program product for screening a work order to diagnose trouble in a telephone system has a computer-readable medium and a Screening Manager module stored on the medium. The Screening Manager updates the work order according to an action corresponding to the search criteria. The corresponding action updates at least one of a telephone system status code, a telephone system route code, and a narrative portion describing the telephone system.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A process of screening a work order to diagnose and to isolate trouble in a telephone system, the process comprising the steps of:
    communicating with a communications network and acquiring work order information, the work order information representing the work order;
    annotating the work order information with at least one of a date, a time, and an origin of the work order;
    filtering the work order information for a screening criteria, the screening criteria having a corresponding action; and
    updating the work order information according to the corresponding action, the corresponding action updating at least one of a telephone system status code, a telephone system route code, and a narrative portion describing the telephone system,
    whereby the process screens the work order for known indications of trouble in the telephone system.

2. A process of screening a work order according to claim 1, further comprising associating an employee code to the work order information.

3. A process of screening a work order according to claim 1, further comprising assigning a specific telephone system status code if the screening criteria is not found.

4. A process of screening a work order according to claim 1, further comprising assigning a specific telephone system route code if the screening criteria is not found.

5. A process of screening a work order according to claim 1, wherein the step of filtering the work order information for the screening criteria comprises filtering the work order information for a nearest appointment date.

6. A process of screening a work order according to claim 1, wherein the step of filtering the work order information for the screening criteria comprises filtering the work order information for a nearest appointment time.

7. A process of screening a work order according to claim 1, wherein the step of filtering the work order information for the screening criteria comprises filtering the work order information for an oldest date.

8. A process of screening a work order according to claim 1, wherein the step of filtering the work order information for the screening criteria comprises filtering the work order information for an oldest time.

9. A process of screening a work order according to claim 1, further comprising filtering the work order information for a subsequent screening criteria, the subsequent screening criteria also having subsequent corresponding action.

10. A process of screening a work order according to claim 9, further comprising updating the work order information according to the subsequent corresponding action.

11. A process of screening a work order according to claim 9, further comprising updating the work order information with a second telephone system status code.

12. A process of screening a work order according to claim 1, further comprising manually updating the work order information if the screening criteria is not found.

13. A process of screening a work order according to claim 12, wherein the step of manually updating the work order information comprises manually updating at least one of the telephone system status code, the telephone system route code, and the narrative portion within the work order.

14. A process of screening a work order according to claim 12, further comprising creating a screening activity log, the screening activity log describing at least one screening of the work order.

15. A process of screening a work order to diagnose and to isolate trouble in a telephone system, the process comprising the steps of:
communicating with a communications network and requesting that the work order be annotated with at least one of a date, a time, and an origin of the work order;
communicating with the communications network and inquiring if the work order contains a screening criteria, the screening criteria having a corresponding action; and
communicating with the communications network and requesting that the work order be updated according to an action corresponding to the screening criteria, the corresponding action updating at least one of a telephone system status code, a telephone system route code, and a narrative portion describing the telephone system,
whereby the process screens the work order to diagnose and to isolate the trouble in the telephone system.

16. A process of screening a work order according to claim 15, further comprising requesting that an employee code be associated with the work order.

17. A process of screening a work order according to claim 15, further comprising requesting that a specific telephone system status code be assigned if the screening criteria is not found.

18. A process of screening a work order according to claim 15, further comprising requesting that a specific telephone system route code be assigned if the screening criteria is not found.

19. A process of screening a work order according to claim 15, wherein the step of inquiring if the work order contains the screening criteria comprises inquiring if the work order contains a nearest appointment date.

20. A process of screening a work order according to claim 15, wherein the step of inquiring if the work order contains the screening criteria comprises inquiring if the work order contains a nearest appointment time.

21. A process of screening a work order according to claim 15, wherein the step of inquiring if the work order contains the screening criteria comprises inquiring if the work order contains an oldest date.

22. A process of screening a work order according to claim 15, wherein the step of inquiring if the work order contains the screening criteria comprises inquiring if the work order contains an oldest time.

23. A process of screening a work order according to claim 15, further comprising requesting that the work order be searched for a subsequent screening criteria, the subsequent screening criteria also having subsequent corresponding action.

24. A process of screening a work order according to claim 23, further comprising requesting that the work order be updated according to the subsequent corresponding action.

25. A process of screening a work order according to claim 23, further comprising requesting that the work order be updated with a second telephone system status code.

26. A process of screening a work order according to claim 15, further comprising permitting a manual update of the work order if the screening criteria is not found.

27. A process of screening a work order according to claim 26, wherein the step of permitting a manual update of the work order comprises permitting a manual update of at least one of the telephone system status code, the telephone system route code, and the narrative portion within the work order.

28. A process of screening a work order according to claim 26, further comprising requesting a screening activity log, the screening activity log describing at least one screening of the work order.

29. A process of screening a work order to diagnose trouble in a telephone system, the process comprising the steps of:
communicating with a communications network and acquiring work order information, the work order information representing the work order;
searching the work order information for a predetermined characteristic of the telephone system; and
updating the work order information with a predetermined action, the predetermined action corresponding to the predetermined characteristic of the telephone system,
whereby the work order is screened for characteristics that help diagnose trouble in the telephone system.

30. A process of screening a work order according to claim 29, wherein searching the work order information for the predetermined characteristic comprises searching the work order information for at least one of a telephone system trouble code, a telephone system central office failure, a telephone system cable failure, and a telephone system terminal equipment failure.

31. A process of screening a work order according to claim 29, wherein searching the work order information for the predetermined characteristic comprises searching the work order information for at least one of a designation of a region, a designation of a time zone, a designation of an area, and a designation of a district.

32. A process of screening a work order according to claim 29, wherein searching the work order information for the predetermined characteristic comprises searching the work order information for at least one of a designation of a manager, a designation of a supervisor, and a designation of a technician.

33. A process of screening a work order according to claim 29, wherein searching the work order information for the predetermined characteristic comprises searching the work order information for a predetermined characteristic of a telephone system local loop.

34. A process of screening a work order according to claim 29, wherein searching the work order information for the predetermined characteristic comprises searching the work order information for a predetermined characteristic of a digital subscriber line system.

35. A process of screening a work order according to claim 29, wherein searching the work order information for the predetermined characteristic comprises searching the work order information for a predetermined characteristic of a fiber optic network system.

36. A process of screening a work order according to claim 29, wherein searching the work order information for the predetermined characteristic comprises searching the work order information for a predetermined characteristic of a digital loop carrier equipment system.

37. A process of screening a work order according to claim 29, wherein searching the work order information for the predetermined characteristic comprises searching the work order information for a predetermined characteristic of a telephone system pair gain equipment system.

38. A process of screening a work order according to claim 29, further comprising annotating the work order information with at least one of a date, a time, and an origin of the work order.

39. A process of screening a work order according to claim 29, wherein the step of updating the work order information with the predetermined action comprises updating at least one of a telephone system status code, a telephone system route code, and a narrative portion describing the telephone system.

40. A process of screening a work order to diagnose trouble in a telephone system, the process comprising the steps of:
communicating with a communications network and acquiring work order information, the work order information representing the work order;
annotating the work order information with at least one of a date, a time, and an origin of the work order;
searching the work order information for a predetermined characteristic of the telephone system; and
updating the work order information with a predetermined action, the predetermined action corresponding to the predetermined characteristic of the telephone system, the predetermined action updating at least one of a telephone system status code, a telephone system route code, and a narrative portion describing the telephone system,
whereby the work order is screened for characteristics that help diagnose trouble in the telephone system.

41. A process of screening a work order according to claim 40, wherein searching the work order information for the predetermined characteristic comprises searching the work order information for at least one of a telephone system trouble code, a telephone system central office failure, a telephone system cable failure, and a telephone system terminal equipment failure.

42. A process of screening a work order according to claim 40, wherein searching the work order information for the predetermined characteristic comprises searching the work order information for at least one of a designation of a region, a designation of a time zone, a designation of an area, and a designation of a district.

43. A process of screening a work order according to claim 40, wherein searching the work order information for the predetermined characteristic comprises searching the work order information for at least one of a designation of a manager, a designation of a supervisor, and a designation of a technician.

44. A process of screening a work order according to claim 40, wherein searching the work order information for the predetermined characteristic comprises searching the work order information for a predetermined characteristic of a telephone system local loop.

45. A process of screening a work order according to claim 40, wherein searching the work order information for the predetermined characteristic comprises searching the work order information for a predetermined characteristic of a digital subscriber line system.

46. A process of screening a work order according to claim 40, wherein searching the work order information for the predetermined characteristic comprises searching the work order information for a predetermined characteristic of a fiber optic network system.

47. A process of screening a work order according to claim 40, wherein searching the work order information for the predetermined characteristic comprises searching the work order information for a predetermined characteristic of a digital loop carrier equipment system.

48. A process of screening a work order according to claim 40, wherein searching the work order information for the predetermined characteristic comprises searching the work order information for a predetermined characteristic of a telephone system pair gain equipment system.

49. A process of screening a work order to diagnose trouble in a telephone system, the process comprising the steps of:
communicating with a communications network and requesting a search of work order information for a predetermined characteristic of the telephone system, the work order information representing the work order; and
communicating with the communications network and requesting an update of the work order information according to a predetermined action, the predetermined action corresponding to the predetermined characteristic of the telephone system, the predetermined action updating at least one of a telephone system status code, a telephone system route code, and a narrative portion describing the telephone system,
whereby the work order is screened for characteristics that help diagnose trouble in the telephone system.

50. A process of screening a work order according to claim 49, wherein requesting the search of the work order information comprises requesting a search for at least one of a telephone system trouble code, a telephone system central office failure, a telephone system cable failure, and a telephone system terminal equipment failure.

51. A process of screening a work order according to claim 49, wherein requesting the search of the work order information comprises requesting a search for at least one of a designation of a region, a designation of a time zone, a designation of an area, and a designation of a district.

52. A process of screening a work order according to claim 49, wherein requesting the search of the work order information comprises requesting a search for at least one of a designation of a manager, a designation of a supervisor, and a designation of a technician.

53. A process of screening a work order according to claim 49, wherein requesting the search of the work order information comprises requesting a search for a characteristic of a telephone system local loop.

54. A process of screening a work order according to claim 49, wherein requesting the search of the work order information comprises requesting a search for a characteristic of a digital subscriber line system.

55. A process of screening a work order according to claim 49, wherein requesting the search of the work order information comprises requesting a search for a characteristic of a fiber optic network system.

56. A process of screening a work order according to claim 49, wherein requesting the search of the work order information comprises requesting a search for a characteristic of a digital loop carrier equipment system.

57. A process of screening a work order according to claim 49, wherein requesting the search of the work order information comprises requesting a search for a characteristic of a telephone system pair gain equipment system.

58. A process of screening a work order according to claim 49, further comprising communicating with the communications network and requesting the work order information be annotated with at least one of a date, a time, and an origin of the work order.

59. A process of screening a work order to diagnose trouble in a telephone system, the process comprising the steps of:
communicating with a communications network and requesting work order information be annotated with at least one of a date, a time, and an origin of the work order, the work order information representing the work order;
communicating with the communications network and requesting a search of the work order information for a predetermined characteristic of the telephone system; and
communicating with the communications network and requesting an update of the work order information according to a predetermined action, the predetermined action corresponding to the predetermined characteristic of the telephone system, the predetermined action updating at least one of a telephone system status code, a telephone system route code, and a narrative portion describing the telephone system,
whereby the work order is screened for characteristics that help diagnose trouble in the telephone system.

60. A process of screening a work order according to claim 59, wherein requesting the search of the work order information comprises requesting a search for at least one of a telephone system trouble code, a telephone system central office failure, a telephone system cable failure, and a telephone system terminal equipment failure.

61. A process of screening a work order according to claim 59, wherein requesting the search of the work order information comprises requesting a search for at least one of a designation of a region, a designation of a time zone, a designation of an area, and a designation of a district.

62. A process of screening a work order according to claim 59, wherein requesting the search of the work order information comprises requesting a search for at least one of a designation of a manager, a designation of a supervisor, and a designation of a technician.

63. A process of screening a work order according to claim 59, wherein requesting the search of the work order information comprises requesting a search for a characteristic of a telephone system local loop.

64. A process of screening a work order according to claim 59, wherein requesting the search of the work order information comprises requesting a search for a characteristic of a digital subscriber line system.

65. A process of screening a work order according to claim 59, wherein requesting the search of the work order information comprises requesting a search for a characteristic of a fiber optic network system.

66. A process of screening a work order according to claim 59, wherein requesting the search of the work order information comprises requesting a search for a characteristic of a digital loop carrier equipment system.

67. A process of screening a work order according to claim 59, wherein requesting the search of the work order information comprises requesting a search for a characteristic of a telephone system pair gain equipment system.

68. A system for screening a work order, comprising:
a Screening Manager module searching work order information for a screening criteria, the work order information representing the work order, the Screening Manager updating the work order according to an action corresponding to the search criteria, the action updating at least one of a telephone system status code, a telephone system route code, and a narrative portion describing the telephone system; and
a processor capable of searching the work order information and capable of updating the work order information.

69. A computer program product for screening a work order to diagnose trouble in a telephone system; comprising:
a computer-readable medium; and
a Screening Manager module stored on the medium, the Screening Manager module searching work order information for a screening criteria, the work order information representing the work order, the Screening Manager updating the work order according to an action corresponding to the search criteria, the action updating at least one of a telephone system status code, a telephone system route code, and a narrative portion describing the telephone system.

* * * * *